United States Patent
Higuchi et al.

(10) Patent No.: US 7,601,792 B2
(45) Date of Patent: Oct. 13, 2009

(54) SILICONE RESIN COMPOSITIONS AND COATED ARTICLES

(75) Inventors: Koichi Higuchi, Gunma-ken (JP); Masaaki Yamaya, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 431 days.

(21) Appl. No.: 11/033,840

(22) Filed: Jan. 13, 2005

(65) Prior Publication Data

US 2005/0158566 A1     Jul. 21, 2005

(30) Foreign Application Priority Data

Jan. 15, 2004   (JP) ............... 2004-008291

(51) Int. Cl.
*C08G 77/18* (2006.01)
(52) U.S. Cl. ............... 528/39; 428/447; 528/41
(58) Field of Classification Search ............... 528/39, 528/41; 428/447, 477
See application file for complete search history.

(56) References Cited

U.S. PATENT DOCUMENTS

| | | | |
|---|---|---|---|
| 3,986,997 A | 10/1976 | Clark | |
| 4,027,073 A | 5/1977 | Clark | |
| 4,159,206 A | 6/1979 | Armbruster et al. | |
| 4,170,690 A | 10/1979 | Armbruster et al. | |
| 4,371,585 A | 2/1983 | Memon | |
| 4,485,130 A | 11/1984 | Lampin et al. | |
| 5,844,060 A * | 12/1998 | Furuya et al. | 528/30 |
| 2003/0236347 A1* | 12/2003 | Furuya et al. | 524/588 |

FOREIGN PATENT DOCUMENTS

| | | |
|---|---|---|
| EP | 0 752 441 A2 | 1/1997 |
| EP | 1 148 105 A2 | 10/2000 |
| EP | 1 146 092 A2 | 10/2001 |
| JP | 51-2736 A | 1/1976 |
| JP | 53-130732 A | 11/1978 |
| JP | 63-168470 A | 7/1988 |
| JP | 63-268772 A | 11/1988 |
| JP | 9-71654 A | 3/1997 |

* cited by examiner

*Primary Examiner*—Kuo-Liang Peng
(74) *Attorney, Agent, or Firm*—Birch, Stewart, Kolasch & Birch, LLP

(57) ABSTRACT

To a silicone resin obtained through cohydrolytic condensation of 100 pbw of a mixture of 1-50 Si mol % of tetraalkoxysilane, 50-99 Si mol % of trialkoxysilane and 0-10 Si mol % of dialkoxysilane with less than 100 pbw of water, having a Mn of at least 1,500 and containing 30-80 mol % of $R^1SiO_{3/2}$ units and 20-70 mol % of $R^1SiO_{2/2}(OX)$ and $R^1SiO_{1/2}(OX)_2$ units combined, a curing catalyst and a solvent are added to formulate a silicone resin composition. It is applied and heat cured to a plastic substrate to form a protective coat having a high hardness and improved properties such as mar resistance, crack resistance, adhesion, water resistance, heat resistance and weathering resistance.

8 Claims, No Drawings

SILICONE RESIN COMPOSITIONS AND COATED ARTICLES

CROSS-REFERENCE TO RELATED APPLICATION

This non-provisional application claims priority under 35 U.S.C. §119(a) on Patent Application No. 2004-008291 filed in Japan on Jan. 15, 2004, the entire contents of which are hereby incorporated by reference.

TECHNICAL FIELD

This invention relates to silicone resin compositions and coated articles using the same. More particularly, it relates to silicone resin compositions which are applied and heat cured to the surface of plastic substrates, typically organic resin substrates, to form coats having a high hardness and improved properties such as mar resistance, crack resistance and weathering resistance, and coated articles having cured coats of the silicone resin compositions on the surface of substrates.

BACKGROUND ART

Prior art coating compositions that form surface protective coats on the surface of plastic substrates, typically organic resin substrates, for imparting a high hardness and mar resistance thereto include coating compositions obtained through (partial) hydrolysis of hydrolyzable organosilanes and coating compositions further comprising colloidal silica.

For example, JP-A 51-2736, JP-A 53-130732 and JP-A 63-168470 disclose coating compositions comprising an organoalkoxysilane, a hydrolysate and/or partial condensate thereof, and colloidal silica, the alkoxy groups being converted in the presence of excess water into silanol. Coats resulting from these coating compositions are suitable for the protection of underlying substrates due to a high hardness and good weathering resistance, but lack toughness. Coats having a thickness of 10 μm or more are likely to crack during heat curing, upon removal from the heat curing furnace, during outdoor service, or upon abrupt temperature changes. A further disadvantage of these coating compositions arises from the fact that the hydrolysate and/or condensate of alkoxysilane is based on relatively low molecular weight compounds for the purpose of producing high hardness coats. In these relatively low molecular weight compounds, silanols having a very high reactivity are contained in large amounts. Such silanols undergo condensation reaction slowly even at normal temperature so that they convert to higher molecular weights with the lapse of time, resulting in coats having lower hardness. Further, some compositions have the problem of stability that they can gel and be no longer used for the coating purpose.

For overcoming these drawbacks, JP-A 63-268772 discloses a coating composition comprising a prepolymer based on a silicon alkoxide, a curing catalyst, and water. This coating composition forms a coat which has improved toughness, but a low hardness. Additionally, the composition is inefficient in application and curing. The cure of the composition is largely affected by humidity.

For overcoming these drawbacks, JP-A 9-71654 discloses a siloxane resin composition comprising a relatively large amount of silanol, which composition is shelf stable and forms a coat having a high hardness and flexibility. This siloxane resin is prepared by hydrolyzing an alkoxysilane with water, the amount of water for hydrolysis being an excess amount relative to the alkoxysilane (specifically 10 to 500 parts by weight of water relative to 10 parts by weight of alkoxysilane), and distilling off the alcohol resulting from hydrolytic condensation at a relatively low temperature of 80° C. or lower, for thereby controlling the proportion in $RSiO_{3/2}$ units of those units having one silanol group represented by $RSiO_{2/2}(OH)$. Although the composition is improved in shelf stability, the use of excess water causes the system efficiency to lower and requires a complex removal step. The coat resulting from the composition is still insufficient in crack resistance and hardness. There is a need for further improvements in these factors.

SUMMARY OF THE INVENTION

An object of the present invention is to provide silicone resin compositions which can form coats having a high hardness and toughness, improved mar resistance, and minimized cracking even on rapid temperature changes, and coated articles having cured coats of the silicone resin compositions on the surface of substrates.

The inventors have found that using specific silicone resins defined below, there are formulated silicone resin compositions which cure into products having a high hardness and toughness, improved mar resistance and crack resistance as well as satisfactory adhesion, water resistance, heat resistance and weatherability.

In one aspect, the present invention provides a silicone resin composition comprising (1) a silicone resin, (2) a curing catalyst, and (3) a solvent as essential components. The silicone resin (1) is obtained by adding 50 parts to less than 100 parts by weight of water at pH 1 to 7 to 100 parts by weight of a mixture of components (A), (B) and (C) for effecting cohydrolytic condensation to form a silicone resin and an alcohol by-product, and distilling off the alcohol until the liquid temperature reaches 80° C. or higher, the mixture consisting of (A) a tetraalkoxysilane having the general formula: $Si(OR')_4$ wherein R' is an alkyl group of 1 to 3 carbon atoms, or a partial hydrolytic condensate thereof, (B) a trialkoxysilane having the general formula: $R^1Si(OR')_3$ wherein $R^1$ is hydrogen or a substituted or unsubstituted monovalent hydrocarbon group and R' is as defined above, or a partial hydrolytic condensate thereof, and (C) a dialkoxysilane having the general formula: $(R^2)_2Si(OR')_2$ wherein $R^2$ is hydrogen or a substituted or unsubstituted monovalent hydrocarbon group and R' is as defined above, or a partial hydrolytic condensate thereof. In the mixture, the total of components (A), (B) and (C) is 100 Si mol %, the content of component (A) is 1 to 50 Si mol % based on the total of components (A), (B) and (C), the content of component (B) is 50 to 99 Si mol % based on the total of components (A), (B) and (C), and the content of component (C) is 0 to 10 Si mol % based on the total of components (A), (B) and (C). The composition should satisfy that (I) the silicone resin have a number average molecular weight of at least 1,500 as measured by gel permeation chromatography (GPC), and (II) the silicone resin contain units of the formula: $R^1SiO_{(3-p)/2}(OX)_p$ derived from component (B) wherein X is hydrogen or R', $R^1$ and R' are as defined above, and p is an integer of 0 to 3, in which units of the formula: $R^1SiO_{3/2}$ wherein $R^1$ is as defined above account for 30 to 80 mol %, and the total of units of the formulae: $R^1SiO_{2/2}(OX)$ and $R^1SiO_{1/2}(OX)_2$ wherein $R^1$ and X are as defined above accounts for 20 to 70 mol %, as analyzed by silicon nuclear magnetic resonance spectroscopy ($^{29}Si$-NMR).

In another aspect, the present invention provides a coated article comprising a substrate and a cured coat of the foregoing silicone resin composition overlying at least one surface of the substrate directly or via at least one layer of different type.

The silicone resin compositions of the invention cure into products having a high hardness, improved mar resistance and crack resistance as well as satisfactory adhesion, water resistance, heat resistance and weatherability and are thus suitable as coating compositions which are applied to the surface of organic resin substrates or the like to form protective coats thereon. Coated articles having cured coats of the inventive silicone resin compositions are suited in applications requiring hardness and weatherability, for example, various glazings, optical members, protective sheets and films for LC and EL displays, signboards, windows on various vehicles such as automobiles, roadside noise barriers, front panels of vending machines, carports, optical and eyeglass lenses.

DESCRIPTION OF THE PREFERRED EMBODIMENTS

One embodiment of the present invention is a silicone resin composition comprising (1) a silicone resin, (2) a curing catalyst, and (3) a solvent as essential components.

Silicone Resin

The silicone resin used herein is obtained by adding 50 parts to less than 100 parts by weight of water at pH 1 to 7 to 100 parts by weight of a mixture of components (A), (B) and (C) for effecting cohydrolytic condensation to form a silicone resin and an alcohol by-product, and distilling off the alcohol until the liquid temperature reaches 80° C. or higher. The mixture consists of component (A) selected from a tetraalkoxysilane having the general formula: $Si(OR')_4$ wherein R' is an alkyl group of 1 to 3 carbon atoms, and a partial hydrolytic condensate thereof, in an amount of 1 to 50 Si mol % based on the total of components (A), (B) and (C), component (B) selected from a trialkoxysilane having the general formula: $R^1Si(OR')_3$ wherein $R^1$ is hydrogen or a substituted or unsubstituted monovalent hydrocarbon group and R' is as defined above, and a partial hydrolytic condensate thereof, in an amount of 50 to 99 Si mol % based on the total of components (A), (B) and (C), and component (C) selected from a dialkoxysilane having the general formula: $(R^2)_2Si(OR')_2$ wherein $R^2$ is hydrogen or a substituted or unsubstituted monovalent hydrocarbon group and R' is as defined above, and a partial hydrolytic condensate thereof, in an amount of 0 to 10 Si mol % based on the total of components (A), (B) and (C).

The composition should satisfy that (I) the silicone resin have a number average molecular weight of at least 1,500 as measured by gel permeation chromatography (GPC), and (II) the silicone resin contain units of the formula: $R^1SiO_{(3-p)/2}(OX)_p$ derived from component (B) wherein X is hydrogen or R', $R^1$ and R' are as defined above, and p is an integer of 0 to 3, in which units of the formula: $R^1SiO_{3/2}$ wherein $R^1$ is as defined above account for 30 to 80 mol %, and the total of units of the formulae: $R^1SiO_{2/2}(OX)$ and $R^1SiO_{1/2}(OX)_2$ wherein $R^1$ and X are as defined above accounts for 20 to 70 mol %, as analyzed by silicon nuclear magnetic resonance spectroscopy ($^{29}$Si-NMR).

For the tetraalkoxysilane having the formula: $Si(OR')_4$ and partial hydrolytic condensate thereof as component (A), R' is an alkyl group of 1 to 3 carbon atoms, such as methyl, ethyl, n-propyl or isopropyl. Examples of suitable tetraalkoxysilanes and partial hydrolytic condensates thereof (A) include, but are not limited to, partial hydrolytic condensates of tetramethoxysilane, tetraethoxysilane, tetraisopropoxysilane, and tetramethoxysilane, which are commercially available as M Silicate 51 from Tama Chemicals Co., Ltd., MSI51 from Colcoat Co., Ltd., MS51 and MS56 from Mitsubishi Chemical Corp.; partial hydrolytic condensates of tetraethoxysilane which are commercially available as Silicate 35 and Silicate 45 from Tama Chemicals Co., Ltd., ESI40 and ESI48 from Colcoat Co., Ltd.; and partial co-hydrolytic condensates of tetramethoxysilane and tetraethoxysilane which are commercially available as FR-3 from Tama Chemicals Co., Ltd., and EMSi48 from Colcoat Co., Ltd.

For the trialkoxysilane having the formula: $R^1Si(OR')_3$ and partial hydrolytic condensate thereof as component (B), $R^1$ is hydrogen or a substituted or unsubstituted monovalent hydrocarbon group. Examples include hydrogen; alkyl groups such as methyl, ethyl, propyl, butyl, pentyl, hexyl, heptyl and octyl; cycloalkyl groups such as cyclopentyl and cyclohexyl; alkenyl groups such as vinyl and allyl; aryl groups such as phenyl; halo-substituted hydrocarbon groups such as chloromethyl, γ-chloropropyl and 3,3,3-trifluoropropyl; and substituted hydrocarbon groups having (meth)acryloxy, γ-glycidoxy, epoxy, mercapto, amino and other groups substituted thereon, such as γ-methacryloxypropyl, γ-glycidoxypropyl, 3,4-epoxycyclohexylethyl, γ-mercaptopropyl, and γ-aminopropyl. Of the substituent groups, halogen atoms, (meth)acryloxy and γ-glycidoxy groups are preferred. R' is as defined above. Examples of suitable trialkoxysilanes and partial hydrolytic condensates thereof (B) include, but are not limited to, partial hydrolytic condensates of hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane, and methyltrimethoxysilane, which are commercially available as KC-89S and X-40-9220 from Shin-Etsu Chemical Co., Ltd.; and partial cohydrolytic condensates of methyltrimethoxysilane and γ-glycidoxypropyltrimethoxysilane, which are commercially available as X-41-1056 from Shin-Etsu Chemical Co., Ltd.

For the dialkoxysilane having the formula: $(R^2)_2Si(OR')_2$ or partial hydrolytic condensate thereof as component (C), $R^2$ is hydrogen or a substituted or unsubstituted monovalent hydrocarbon group, examples of which are as enumerated above for $R^1$, and R' is as defined above. Examples of suitable dialkoxysilanes and partial hydrolytic condensates thereof (C) include, but are not limited to, partial hydrolytic condensates of methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldiethoxysilane, γ-aminopropylmethyldiethoxysilane, and N-(2-aminoethyl)aminopropylmethyldimethoxysilane.

Of the aforementioned groups represented by $R^1$ and $R^2$ in components (B) and (C), alkyl groups are preferred for use in applications requiring mar resistance and weatherability, and epoxy and (meth)acryloxy-substituted hydrocarbon groups are preferred where toughness and dyeability are required.

Of the aforementioned groups represented by R' in components (A), (B) and (C), methyl and ethyl groups are preferred because the reactivity during hydrolytic condensation is high and the resulting alcohol R'OH has a high vapor pressure and is easy to distill off.

More preferably in components (A), (B) and (C), R' is methyl or ethyl, $R^1$ and $R^2$ which may be the same or different are hydrocarbon groups of 1 to 3 carbon atoms which may or may not be substituted with halogen atoms, (meth)acryloxy groups or γ-glycidoxy groups. Even more preferably, at least 50 mol % of the total of $R^1$ and $R^2$ groups in components (A), (B) and (C) are methyl.

In the silicone resin of the invention, provided that the total of components (A), (B) and (C) is 100 Si mol %, component (A) should be used in a proportion of 1 to 50 Si mol %, preferably 5 to 45 Si mol %, component (B) be used in a proportion of 50 to 99 Si mol %, preferably 54.5 to 94.5 Si mol %, and component (C) be used in a proportion of 0 to 10 Si mol %, preferably 0.5 to 8 Si mol %, based on the total of components (A), (B) and (C). If the content of component (B) serving as a main component is less than 50 Si mol %, the resulting resin tends to be less curable due to a lower crosslinking density, resulting in a cured film having a lower hardness. If the content of component (A) is in excess of 50 Si mol %, the resulting resin may have a lower toughness due to a higher crosslinking density, failing to avoid cracking. It is noted that the term "Si mol %" refers to a percent based on entire Si moles. By the Si mole for a monomer, it is meant that its molecular weight is 1 mole, and for a dimer, its average molecular weight divided by 2 is 1 mole.

In preparing the silicone resin of the invention, a mixture of alkoxysilanes or partial hydrolytic condensates thereof as components (A), (B) and (C) is first co-hydrolyzed with water at pH 1 to 7, preferably pH 2 to 6, and more preferably pH 2 to 5. For adjustment to the desired pH range and promoted hydrolysis, organic or inorganic acids may be used as the catalyst, for example, hydrogen fluoride, hydrochloric acid, nitric acid, formic acid, acetic acid, propionic acid, oxalic acid, citric acid, maleic acid, benzoic acid, malonic acid, glutaric acid, glycolic acid, methanesulfonic acid, and toluenesulfonic acid. Alternatively, solid acid catalysts in the form of cation exchange resins having carboxylic or sulfonic acid groups on their surface may be used as the catalyst. Such catalysts are used in catalytic amounts, typically in the range of 0.0001 to 30% by weight based on the total weight of components (A), (B) and (C).

For the hydrolysis, the amount of water used should be from 50 parts by weight to less than 100 parts by weight per 100 parts by weight of the mixture of alkoxysilanes or partial hydrolytic condensates thereof as components (A), (B) and (C). With less than 50 parts by weight of water, the resulting silicone resin may have a number average molecular weight, as measured by GPC with polystyrene standards, which is not built up to the optimum region to be described later. If the amount of water used is equal to or more than 100 parts by weight, the resulting silicone resin may become such that the proportion of units of the formula: $R^1SiO_{3/2}$ (wherein $R^1$ is as defined above) in the units of the formula: $R^1SiO_{(3-p)/2}(OX)_p$ derived from component (B) (wherein X is hydrogen or R', $R^1$ and R' are as defined above, and p is an integer of 0 to 3) does not reach the optimum range to be described later, and system efficiency becomes decreased. Also inconveniently, a final composition formulated with such silicone resin becomes inefficient in application and drying due to the influence of residual water, and an extra step of removing residual water must be added in order to overcome such a problem.

Hydrolysis can be performed by adding dropwise or pouring water to the alkoxysilanes or partial hydrolytic condensates thereof, or inversely, by adding dropwise or pouring the alkoxysilanes or partial hydrolytic condensates thereof to water, or by mixing a portion of the alkoxysilanes or partial hydrolytic condensates thereof with water to effect hydrolysis and adding dropwise or pouring the remainder. An organic solvent may be contained herein. However, the absence of organic solvent is preferred because of the tendency that the resulting silicone resin is reduced in number average molecular weight (measured by GPC with polystyrene standards) as the amount of an organic solvent contained increases.

The hydrolysis must be followed by condensation before the silicone resin of the invention can be obtained. Condensation may be continuously carried out subsequent to the hydrolysis while typically heating at a liquid temperature from normal temperature to 120° C. Temperatures above 120° C. may cause the liquid to gel. Condensation can be promoted by distilling off the alcohol(s) resulting from hydrolysis under atmospheric or reduced pressure until a temperature of at least 80° C. is reached.

To promote the condensation, condensation catalysts such as basic compounds, acidic compounds or metal chelate compounds may be added in catalytic amounts. Prior to or during the step of distilling off the alcohol, an organic solvent may be added for the purpose of adjusting the condensation and concentration. In general, as condensation proceeds, silicone resins become higher in molecular weight and less soluble in water and the alcohol(s) formed. Thus, the organic solvent to be added should preferably be selected from more polar organic solvents have a boiling point of at least 80° C. in which silicone resins are effectively dissolvable. Examples of suitable organic solvents include alcohols such as isopropyl alcohol and butanol; ketones such as methyl propyl ketone, diethylketone, methyl isobutyl ketone, cyclohexanone and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as propyl acetate, butyl acetate, and cyclohexyl acetate. The amount of the organic solvent added at this stage is preferably such that the silicone resin composition may eventually have a solids concentration of 1 to 30% by weight.

The silicone resin resulting from condensation has a number average molecular weight, as measured by gel permeation chromatography (GPC) with polystyrene standards, of at least 1,500. The number average molecular weight (Mn) as measured by GPC with polystyrene standards is preferably in the range of 1,500 to 50,000, more preferably 1,800 to 40,000, and even more preferably 2,000 to 20,000. With a Mn below the range, coats may become less tough and liable to cracking. With a Mn above the range, coats tend to have a lower hardness and undergo resin phase separation, becoming whitened.

By performing condensation under the above-described conditions, the resulting silicone resin contains units of the formula: $R^1SiO_{(3-p)/2}(OX)_p$ (wherein X is hydrogen or R', $R^1$ and R' are as defined above, and p is an integer of 0 to 3), in which units of the formula: $R^1SiO_{3/2}$ corresponding to p=0 account for 30 to 80 mol %, and the total of units of the formulae: $R^1SiO_{2/2}(OX)$ corresponding to p=1 and $R^1SiO_{1/2}(OX)_2$ corresponding to p=2 accounts for 20 to 70 mol %, as analyzed by silicon nuclear magnetic resonance spectroscopy ($^{29}Si$-NMR). It is preferred that units of the formula $R^1Si(OX)_3$ corresponding to p=3 be substantially absent.

Illustrative examples of units of the formula: $R^1SiO_{(3-p)/2}(OX)_p$ include:
$R^1Si(OX)_3$ for p=3,
$R^1SiO_{1/2}(OX)_2$ for p=2,
$R^1SiO_{2/2}(OX)$ for p=1, and
$R^1SiO_{3/2}$ for p=0 wherein $R^1$ and X are as defined above.

In the silicone resin of the invention, the content of the units of the formula: $R^1SiO_{3/2}$ should be 30 to 80 mol %, preferably 35 to 75 mol % of the units of the formula: $R^1SiO_{(3-p)/2}(OX)_p$ wherein X is H or R', $R^1$ and R' are as defined above, and p is an integer of 0 to 3. If the content of these units is less than 30 mol %, coats may become less tough and liable to crack. If the content of these units is more than 80 mol %, coats tend to have an insufficient hardness.

Also, the total content of units of the formulae: $R^1SiO_{2/2}(OX)$ and $R^1SiO_{1/2}(OX)_2$ should be 20 to 70 mol %, preferably 22 to 67 mol % of the units of the formula: $R^1SiO_{(3-p)/2}(OX)_p$. If the total content is less than 20 mol %, coats tend to have an insufficient hardness. If the total content is more than 70 mol %, coats may become less tough and liable to crack.

It is noted that the analytical values of GPC and NMR are those of a reaction solution containing the silicone resin produced by the foregoing process, which has been filtered.

Silicone Resin Composition

A silicone resin composition in one embodiment of the present invention is arrived at by adding a curing catalyst to the silicone resin produced by the foregoing process. Specifically the curing catalyst may be added to the reaction solution containing the silicone resin.

The curing catalyst serves to promote curing when the silicone resin composition is processed to form a coat. Examples of suitable curing catalysts include basic compounds such as lithium hydroxide, sodium hydroxide, sodium methoxide, sodium formate, sodium acetate, potassium propionate, ammonia, triethylamine, n-hexylamine, diazabicycloundecene, tetramethylammonium hydroxide, benzyltrimethylammonium hydroxide, and tetrabutylphosphonium hydroxide; metal-containing compounds such as tetraisopropyl titanate, tetrabutyl titanate, aluminum triisobutoxide, aluminum acetylacetonate, aluminum perchlorate, zinc formate, zinc octylate, zinc acetylacetonate, cobalt octylate, cobalt acetylacetonate, iron acetylacetonate, tin acetylacetonate, and dibutyltin laurate; and acidic compounds such as hydrochloric acid, acetic acid and p-toluenesulfonic acid.

The amount of curing catalyst used is not particularly limited, but is preferably in the range of 0.0001 to 30% by weight based on the silicone resin solids.

The silicone resin composition of the invention further comprises a solvent or diluent. Using the solvent or diluent, the silicone resin composition is preferably adjusted to a solids concentration of 1 to 30% by weight. Outside the range, some coats resulting from the coating and curing of the composition become defective. Specifically, below the range, coats tend to become twisted or mottled, failing to provide the desired hardness and mar resistance. Beyond the range, coats are susceptible to blushing or whitening and cracking.

Suitable solvents or diluents include water and organic solvents, examples of which include alcohols such as methanol, ethanol, isopropanol, n-butanol, isobutanol, diacetone alcohol and benzyl alcohol; glycol derivatives such as ethylene glycol, ethylene glycol monobutyl ether, propylene glycol, propylene glycol monomethyl ether, propylene glycol monomethyl ether acetate, and dipropylene glycol monomethyl ether; ketones such as acetone, methyl ethyl ketone, methyl isobutyl ketone, and cyclohexanone; and esters such as ethyl acetate and isobutyl acetate. Any one or a mixture of two or more selected from the above group may be used.

To the silicone resin composition of the invention, pH modifiers, leveling agents, thickeners, pigments, dyes, microparticulate metal oxides, metal powders, antioxidants, UV absorbers, UV stabilizers or the like may be added, if necessary, and as long as they do not compromise the benefits of the invention.

Specifically, for rendering the silicone resin composition of the invention more stable, the liquid is preferably maintained at pH 2 to 7, more preferably pH 3 to 6. Since shelf stability can be substantially degraded at pH outside the range, a pH modifier may be added for adjusting the pH to the above range. Where the pH of the silicone resin composition is more acidic outside the range, a basic compound such as ammonia or ethylene diamine may be added for pH adjustment. Where the pH of the silicone resin composition is more basic outside the range, an acidic compound such as hydrochloric acid, nitric acid, acetic acid or citric acid may be added for pH adjustment. However, the pH adjusting technique is not limited to these.

For the purpose of improving the hardness and mar resistance of cured coats obtained by coating and curing the silicone resin composition of the invention and for imparting thereto additional functions such as a higher refractive index, UV barrier, antistatic, IR reflection and IR absorption, there may be added microparticulate metal oxides, metal chelate compounds of titanium, zinc, zirconium or the like, and (partial) hydrolysates and condensates thereof. For the microparticulate metal oxides, the shape and size of particles are not particularly limited although a smaller particle size is better for forming more transparent coats. Examples of microparticulate metal oxides include, but are not limited to, silica, alumina, titania, ceria, tin oxide, zirconia, antimony oxide, indium oxide, iron oxide, titania doped with iron oxide and/or zirconia, rare earth oxides, and mixtures and compound oxides thereof. Colloidal dispersions of such microparticulate metal oxides may also be used. Alternatively, metal oxides in powder form may be dispersed in the silicone resin compositions. The amount of microparticulate metal oxide added is preferably 0.1 to 300% by weight based on the silicone resin solids.

When the silicone resin composition of the invention is applied and cured to substrates of organic resins or wood to form cured coats thereon, a UV absorber and/or UV stabilizer may be added to the composition for the purpose of preventing the substrate from yellowing and surface deterioration. Those UV absorbers and UV stabilizers which are compatible with the silicone resin composition of the invention and less volatile are preferred.

Examples of UV absorbers include inorganic absorbers, for example, microparticulate oxides of the type described above such as titanium oxide, cerium oxide and zirconium oxide, metal chelate compounds of titanium, zinc, zirconium and the like, and (partial) hydrolysates and condensates thereof. Preferred organic UV absorbers are derivatives of hydroxybenzophenone, benzotriazole, cyanoacrylate and triazine backbone compounds. Also included are vinyl and other polymers having such UV absorbers incorporated on side chains and copolymers thereof with other vinyl monomers, and silyl-modified UV absorbers and (partial) hydrolytic condensates thereof. Examples include 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-methylphenyl)benzotriazole, 2-(2-hydroxy-5-t-octylphenyl)benzotriazole, 2-(2-hydroxy-3,5-di-t-butylphenyl)benzotriazole, ethyl 2-cyano-3,3-diphenylacrylate, 2-ethylhexyl 2-cyano-3,3-diphenylacrylate, 2-(2-hydroxy-4-hexyloxyphenyl)-4,6-diphenyltriazine, (co)polymers of 2-hydroxy-4-(2-acryloxyethoxy)benzophenone, (co)polymers of 2-(2'-hydroxy-5'-methacryloxyethylphenyl)-2H-benzotriazole, the reaction product of 2,4-dihydroxybenzophenone with γ-glycidoxypropyltrimethoxysilane, the reaction product of 2,2',4,4'-tetrahydroxybenzophenone with γ-glycidoxypropyltrimethoxysilane, and (partial) hydrolysates thereof. These organic UV absorbers may be used in admixture of two or more.

Preferred UV stabilizers are low volatile compounds which have at least one cyclic hindered amine structure within a molecule and are compatible with the silicone resin composition of the invention. Examples include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)-pyrrolidine-2,5-dione, N-acetyl-3-dodecyl-1-(2,2,6,6-tetramethyl-4-piperidinyl)-pyrrolidine-2,5-dione, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, condensates of 1,2,3,4-butanetetracarboxylic acid with 2,2,6,6-tetramethyl-piperidinol and tridecanol, 8-acetyl-3-dodecyl-7,7,9,9-tetramethyl-1,3,8-trisazaspiro-[4,5]decane-2,4-dione, condensates of 1,2,3,4-butanetetracarboxylic acid with 1,2,2,6,6-pentamethyl-4-piperidinol and β,β,β,β'-tetramethyl-3,9-(2,4,8,10-tetraoxaspiro[5,5]undecane)diethanol, condensates of 1,2,3,4-butanetetracarboxylic acid with 1,2,2,6,6-pentamethyl-4-piperidinol and β,β,β,β'-tetramethyl-3,9-(2,4,8,10-tetraoxaspiro[5,5]undecane)diethanol, (co)polymers of 2,2,6,6-tetramethyl-4-piperidinyl methacrylate, and (co)polymers of 1,2,2,6,6-pentamethyl-4-piperidinyl methacrylate. Also useful for the purpose of fixing the UV stabilizer are silyl-modified photostabilizers as described in JP-B 61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyldiethoxysilane, and (partial) hydrolysates thereof. These UV stabilizers may be used in admixture of two or more.

Preferably, these UV absorbers, UV stabilizers or photostabilizers are compounded in amounts of 0.2 to 30% by weight based on the silicone resin solids.

The silicone resin compositions of the invention may be applied to substrates by any conventional coating technique. A suitable coating technique may be selected from among, for example, brush coating, spraying, dipping, flow coating, roll coating, curtain coating, spin coating, and knife coating.

The substrates used herein include molded plastics, wood, ceramics, glass, metals and composites thereof and are not limited thereto. Advantageously, the silicone resin compositions of the invention are applied to substrates of various plastics, typically polycarbonates, polystyrene, acrylic resins, modified acrylic resins, urethane resins, thiourethane resins, polycondensates of halogenated bisphenol A with ethylene glycol, acrylic urethane resins, halogenated aryl-containing acrylic resins, and sulfur-containing resins. Also included are these resin substrates whose surface has been treated, for example, by corona discharge treatment, plasma treatment or treatment with acid or alkaline liquid, as well as laminates of a substrate of a certain resin and a surface layer of a different resin. Exemplary laminates include laminates comprising a polycarbonate resin substrate and a surface layer of acrylic resin or urethane resin, and laminates comprising a polyester resin substrate and a surface layer of acrylic resin, which are manufactured by a co-extrusion or laminating technique.

The cured coat of the silicone resin composition of the invention can be formed on the surface of a resin substrate directly or through an intervening layer if necessary. Such an intervening layer is selected from among a primer layer, UV-absorbing layer, printing layer, recording layer, thermal barrier layer, adhesive layer, inorganic evaporated film layer, etc.

Once the silicone resin composition of the invention is coated, it may be cured either by holding in air for drying or by heating. Although the curing temperature and time are not critical, the coating is heated preferably at a temperature below the heat resistant temperature of the substrate for 10 minutes to 2 hours. Specifically, heating at 80 to 135° C. for 30 minutes to 2 hours is preferred. The thickness of coats is not particularly limited and is typically in the range of 0.1 to 50 μm. Coats having a thickness of 1 to 20 μm are preferred because they meet the desired hardness, mar resistance, long-lasting adhesion and crack-arresting property.

EXAMPLE

Synthesis Examples, Examples, and Comparative Examples are given below for further illustrating the invention, but the invention is not limited thereto. All % are by weight unless otherwise stated.

[Preparation of Silicone Resins]

Synthesis Example 1

A 2-liter flask was charged with 339 g (2.49 Si moles) of methyltrimethoxysilane and 37 g (0.22 Si mole) of Silicate 35 (trade name, by Tama Chemicals Co., Ltd., partial hydrolytic condensate of tetraethoxysilane, average dimer), which were thoroughly admixed. The liquid was then cooled to about 10° C., after which 308 g of 0.25N acetic acid aqueous solution was added dropwise for effecting hydrolysis while cooling so that the internal temperature did not exceed 40° C. At the end of dropwise addition, the reaction solution was stirred below 40° C. for one hour and then at 60° C. for 3 hours for driving hydrolysis to completion.

Thereafter, 300 g of cyclohexanone was admitted to the reaction solution, from which methanol and ethanol resulting from hydrolysis were distilled off under atmospheric pressure until the solution temperature reached 95° C. Then 470 g of isopropanol was added as a diluent, yielding a colorless clear silicone resin reaction solution A having a nonvolatile concentration of 19.5%.

Synthesis Example 2

A 2-liter flask was charged with 232 g (2.29 Si moles) of KC-89S (trade name, by Shin-Etsu Chemical Co., Ltd., partial hydrolytic condensate of methyltrimethoxysilane) and 86 g (0.57 Si mole) of Silicate 40 (trade name, by Tama Chemicals Co., Ltd., partial hydrolytic condensate of tetraethoxysilane, average 5 monomer unit oligomer), which were thoroughly admixed. The liquid was then cooled to about 10° C., after which 245 g of 0.05N hydrochloric acid aqueous solution was added dropwise for effecting hydrolysis while cooling so that the internal temperature did not exceed 40° C. At the end of dropwise addition, the reaction solution was stirred below 40° C. for 5 hours for driving hydrolysis to completion.

Thereafter, 300 g of cyclohexanone was admitted to the reaction solution, from which methanol and ethanol resulting from hydrolysis were distilled off under atmospheric pressure until the solution temperature reached 100° C. Then 470 g of isopropanol was added as a diluent, yielding a colorless clear silicone resin reaction solution B having a nonvolatile concentration of 18.4%.

Synthesis Example 3

A 2-liter flask was charged with 170 g (1.25 Si moles) of methyltrimethoxysilane and 56 g (0.33 Si mole) of Silicate 35 (trade name, by Tama Chemicals Co., Ltd., partial hydrolytic condensate of tetraethoxysilane, average dimer), which were thoroughly admixed. The liquid was then cooled to about 10° C., after which 308 g of 0.25N acetic acid aqueous solution was added dropwise for effecting hydrolysis while cooling so that the internal temperature did not exceed 40° C. At the end of dropwise addition, the reaction solution was stirred below 40° C. for one hour and then at 60° C. for 2 hours. Further, 170 g (1.25 Si moles) of methyltrimethoxysilane was added dropwise to the solution, which was stirred at 60° C. for 2 hours for driving hydrolysis to completion.

Thereafter, 300 g of cyclohexanone was admitted to the reaction solution, from which methanol and ethanol resulting from hydrolysis were distilled off under atmospheric pressure until the solution temperature reached 95° C. Then 470 g of isopropanol was added as a diluent, yielding a colorless clear silicone resin reaction solution C having a nonvolatile concentration of 20.4%.

Synthesis Example 4

A 2-liter flask was charged with 184 g (1.35 Si moles) of methyltrimethoxysilane, 33 g (0.15 Si mole) of 3,3,3-trifluoropropyltrimethoxysilane, 160 g (1.05 Si moles) of tetramethoxysilane, and 36 g (0.30 Si mole) of dimethyldimethoxysilane, which were thoroughly admixed. The liquid was then cooled to about 10° C., after which 321 g of 0.25N acetic acid aqueous solution was added dropwise for effecting hydrolysis while cooling so that the internal temperature did not exceed 40° C. At the end of dropwise addition, the reaction solution was stirred below 40° C. for one hour and then at 60° C. for 2 hours for driving hydrolysis to completion.

Thereafter, 300 g of propylene glycol monomethyl ether acetate was admitted to the reaction solution, from which methanol resulting from hydrolysis was distilled off under atmospheric pressure until the solution temperature reached 110° C. Then 470 g of isopropanol was added as a diluent, yielding a colorless clear silicone resin reaction solution D having a nonvolatile concentration of 18.4%.

Synthesis Example 5

A 2-liter flask was charged with 400 g (2.25 Si moles) of methyltriethoxysilane, 91 g (0.60 Si mole) of tetramethoxysilane, and 37 g (0.15 Si mole) of γ-glycidoxypropylmethyldiethoxysilane, which were thoroughly admixed. The liquid was then cooled to about 10° C., after which 306 g of 0.25N acetic acid aqueous solution was added dropwise for effecting hydrolysis while cooling so that the internal temperature did not exceed 40° C. At the end of dropwise addition, the reaction solution was stirred below 40° C. for one hour and then at 60° C. for 3 hours for driving hydrolysis to completion.

Thereafter, 300 g of methyl isobutyl ketone was admitted to the reaction solution, from which methanol and ethanol resulting from hydrolysis were distilled off under atmospheric pressure until the solution temperature reached 110° C. Then 470 g of isopropanol was added as a diluent, yielding a colorless clear silicone resin reaction solution E having a nonvolatile concentration of 20.9%.

Comparative Synthesis Example 1

A 2-liter flask was charged with 232 g (2.29 Si moles) of KC-89S (trade name, by Shin-Etsu Chemical Co., Ltd., partial hydrolytic condensate of methyltrimethoxysilane), 86 g (0.57 Si mole) of Silicate 40 (trade name, by Tama Chemicals Co., Ltd., partial hydrolytic condensate of tetraethoxysilane, average 5 monomer unit oligomer), and 240 g of methanol, which were thoroughly admixed. The liquid was then cooled to about 10° C., after which 245 g of 0.05N hydrochloric acid aqueous solution was added dropwise for effecting hydrolysis while cooling so that the internal temperature did not exceed 40° C. At the end of dropwise addition, the reaction solution was stirred at 60° C. for 6 hours for driving hydrolysis to completion.

Thereafter, 300 g of cyclohexanone was admitted to the reaction solution, from which methanol and ethanol resulting from hydrolysis were distilled off for one hour at a reduced pressure of 80 mmHg and a solution temperature of up to 50° C. Then 470 g of isopropanol was added as a diluent, yielding a colorless clear silicone resin reaction solution F having a nonvolatile concentration of 20.4%.

Comparative Synthesis Example 2

A 2-liter flask was charged with 240 g (1.35 Si moles) of methyltriethoxysilane and 343 g (1.65 Si moles) of tetraethoxysilane, which were thoroughly admixed. The liquid was then cooled to about 10° C., after which 345 g of 0.25N acetic acid aqueous solution was added dropwise for effecting hydrolysis while cooling so that the internal temperature did not exceed 40° C. At the end of dropwise addition, the reaction solution was stirred at 60° C. for 3 hours for driving hydrolysis to completion.

Thereafter, 300 g of cyclohexanone was admitted to the reaction solution, from which ethanol resulting from hydrolysis was distilled off under atmospheric pressure until the solution temperature reached 105° C. Then 470 g of isopropanol was added as a diluent, yielding a colorless clear silicone resin reaction solution G having a nonvolatile concentration of 20.4%.

Comparative Synthesis Example 3

A 2-liter flask was charged with 600 g (3.37 Si moles) of methyltriethoxysilane, 168 g of isobutanol, and 0.4 g of acetic acid, which was cooled below 10° C. Then 372 g of silica sol dispersed in water, Snowtex O (trade name, Nissan Chemical Industries, Ltd.) was added to the solution, after which hydrolysis was effected below 10° C. for 3 hours. Next, 105 g of silica sol dispersed in isobutanol, IBA-ST-20 (trade name, Nissan Chemical Industries, Ltd.) and 29 g of isobutanol were added to the solution, which was stirred at room temperature for 16 hours and then at 60° C. for 4 hours for driving hydrolysis to completion.

To the solution were added 43 g of ethanol, 67 g of isopropanol, 217 g of propylene glycol monomethyl ether and 170 g of isobutanol as diluents, 0.7 g of KP-341 (trade name, by Shin-Etsu Chemical Co., Ltd.) as a leveling agent, and 0.1 g of sodium acetate and 0.8 g of a 40% methanol solution of benzyltrimethylammonium hydroxide as curing catalysts. The mixture was thoroughly stirred and passed through a paper filter, yielding a colorless translucent coating composition H having a nonvolatile concentration of 19.7%.

The silicone resins obtained above were analyzed by gel permeation chromatography (GPC) using polystyrene standards and silicon nuclear magnetic resonance spectroscopy ($^{29}$Si-NMR), with the results being shown in Tables 1 and 2.

TABLE 1

Unit contents and results of GPC analysis

| Example | | $SiO_{(4-o)/2}(OX)_o$ units (mol %) | $R^1SiO_{(3-p)/2}(OX)_p$ units (mol %) | $(R^2)_2Si_{(2-q)/2}(OX)_q$ units (mol %) | Mn | Dispersity |
|---|---|---|---|---|---|---|
| Synthesis Example 1 | Silicone resin A | 8 | 92 | — | 2,390 | 2.0 |
| Synthesis Example 2 | Silicone resin B | 20 | 80 | — | 2,800 | 2.6 |
| Synthesis Example 3 | Silicone resin C | 12 | 88 | — | 3,050 | 2.8 |
| Synthesis Example 4 | Silicone resin D | 35 | 50 | 10 | 5,500 | 5.8 |
| Synthesis Example 5 | Silicone resin E | 20 | 75 | 5 | 2,670 | 4.0 |
| Comparative Synthesis Example 1 | Silicone resin F | 20 | 80 | — | 1,300 | 1.9 |
| Comparative Synthesis Example 2 | Silicone resin G | 55 | 35 | — | 6,100 | 5.9 |
| Comparative Synthesis Example 3 | Composition H | 33 | 67 | — | 600 | 1.3 |

It is noted that Mn is a number average molecular weight, Mw is a weight average molecular weight, and dispersity is a molecular weight distribution Mw/Mn.

$SiO_{(4-o)/2}(OX)_o$ units: units derived from tetraalkoxysilane or partial hydrolytic condensate thereof wherein X is H or R' which is $C_1$-$C_3$ alkyl, and subscript o is an integer of 0-4.

$R^1SiO_{(3-p)/2}(OX)_p$ units: units derived from trialkoxysilane or partial hydrolytic condensate thereof wherein $R^1$ is H or a substituted or unsubstituted monovalent hydrocarbon group, X is as defined above, and subscript p is an integer of 0-3.

$(R^2)_2Si_{(2-q)/2}(OX)_q$ units: units derived from dialkoxysilane or partial hydrolytic condensate thereof wherein $R^2$ is H or a substituted or unsubstituted monovalent hydrocarbon group, X is as defined above, and subscript q is an integer of 0-2.

TABLE 2

Results of $^{29}$Si-NMR analysis

| Example | | $R^1SiO_{3/2}$ unit content (%) | $R^1SiO_{2/2}(OX)$ unit content (%) | $R^1SiO_{3/2}(OX)_2$ unit content (%) | $SiO_{4/2}$ unit content (%) | $SiO_{3/2}(OX)$ unit content (%) | $SiO_{2/2}(OX)_2$ unit content (%) |
|---|---|---|---|---|---|---|---|
| | | in $R^1SiO_{(3-p)/2}(OX)_p$ units | | | in $SiO_{(4-o)/2}(OX)_o$ units | | |
| Synthesis Example 1 | Silicone resin A | 52.5 | 44.0 | 3.5 | 72.3 | 19.6 | 8.1 |
| Synthesis Example 2 | Silicone resin B | 44.6 | 50.9 | 4.5 | 60.9 | 31.5 | 7.6 |

TABLE 2-continued

| | | Results of $^{29}$Si-NMR analysis | | | | | |
|---|---|---|---|---|---|---|---|
| | | $R^1SiO_{3/2}$ unit content (%) | $R^1SiO_{2/2}(OX)$ unit content (%) | $R^1SiO_{3/2}(OX)_2$ unit content (%) | $SiO_{4/2}$ unit content (%) | $SiO_{3/2}(OX)$ unit content (%) | $SiO_{2/2}(OX)_2$ unit content (%) |
| Example | | in $R^1SiO_{(3-p)/2}(OX)_p$ units | | | in $SiO_{(4-o)/2}(OX)_o$ units | | |
| Synthesis Example 3 | Silicone resin C | 42.5 | 52.0 | 5.5 | 74.6 | 17.4 | 8.0 |
| Synthesis Example 4 | Silicone resin D | 72.3 | 25.8 | 1.9 | 62.6 | 30.5 | 6.9 |
| Synthesis Example 5 | Silicone resin E | 38.0 | 57.1 | 4.9 | 59.1 | 34.5 | 6.4 |
| Comparative Synthesis Example 1 | Silicone resin F | 28.4 | 52.6 | 19.0 | 40.9 | 41.7 | 17.4 |
| Comparative Synthesis Example 2 | Silicone resin G | 28.6 | 57.7 | 13.7 | 100.0 | — | — |
| Comparative Synthesis Example 3 | Composition H | 62.6 | 36.5 | 0.9 | 62.0 | 31.5 | 6.5 |

Note that the content of $R^1Si(OX)_3$ units in $R^1SiO_{(3-p)/2}(OX)_p$ units was below the detection limit; and that both the contents of $SiO_{1/2}(OX)_3$ units and $Si(OX)_4$ units in $SiO_{(4-o)/2}(OX)_o$ units were below the detection limit.

[Tests on Cured Coats of Silicone Resin Compositions]

Example I and Comparative Example I

To each of silicone resin reaction solutions A to G obtained in Synthesis Examples 1 to 5 (SE1-5) and Comparative Synthesis Examples 1 to 2 (CSE1-2), 0.2 g of polyether silicone (KP-341, by Shin-Etsu Chemical Co., Ltd.) was added as a leveling agent. Using isopropanol, each solution was then adjusted to a nonvolatile concentration of 18%. A 4% methanol solution of benzyltrimethylammonium hydroxide was then added as a curing catalyst in an amount of 0.2% based on the silicone resin. Filtration through a paper filter gave a series of coating compositions. Some coating compositions were formulated by further compounding various additives (including microparticulate metal oxides, UV absorbers, light stabilizer and flexibilizer) in the amounts shown in Table 3.

<Microparticulate Metal Oxides>
Particle I: 30% isopropanol dispersion of silica sol (IPA-ST, by Nissan Chemical Industries Ltd.)
Particle II: 20% methanol dispersion of titanium oxide-containing compound metal oxide (1120Z, by Catalyst & Chemicals Ind. Co., Ltd.)

<UV Absorbers>
UVA-I: 50% 1-methoxy-2-propanol solution of a copolymer of 30% 2-(2'-hydroxy-5'-methacryloxyethylphenyl)-2H-benzotriazole and 70% methyl methacrylate (PUVA-NW, by Otsuka Chemical Co., Ltd.)
UVA-II: 2-[4-[(2-hydroxy-3-dodecyl/tridecyl-oxypropyl)oxy]-2-hydroxyphenyl]-4,6-bis(2,4-dimethylphenyl)-1,3,5-triazine (Tinuvin 400, by Ciba Specialty Chemicals)

<Hindered Amine Light Stabilizer>
HALS-I: N-acetyl-3-dodecyl-1-(2,2,6,6-tetramethyl-4-piperidinyl)pirrolidine-2,5-dione (Sandbar 3058Liq., Clariant)

<Flexibilizer>
Flexibilizer I: 25% isobutanol solution of polymethylsiloxane (KR-220L, by Shin-Etsu Chemical Co., Ltd.)

TABLE 3

| | | Results of coat performance evaluation | | | | | | | |
|---|---|---|---|---|---|---|---|---|---|
| Base silicone resin | Additive | Coating composition | Coat appearance | Mar resistance | Adhesion | Water resistance (appearance) | Water resistance (adhesion) | Heat resistance | Shelf stability |
| A (Synthesis Example 1) | — | A1 | sound | 13 | 25/25 | sound | 25/25 | sound | OK |
| A (Synthesis Example 1) | Particle I 3% | A2 | sound | 8 | 25/25 | sound | 25/25 | sound | OK |
| B (Synthesis Example 2) | UVA-I 4% | B1 | sound | 11 | 25/25 | sound | 25/25 | sound | OK |
| C (Synthesis Example 3) | UVA-II 0.5% + HALS-I 0.1% | C1 | sound | 10 | 25/25 | sound | 25/25 | sound | OK |
| C (Synthesis Example 3) | Flexibilizer I 10% | C2 | sound | 15 | 25/25 | sound | 25/25 | sound | OK |

TABLE 3-continued

Results of coat performance evaluation

| Base silicone resin | Additive | Coating composition | Coat appearance | Mar resistance | Adhesion | Water resistance (appearance) | Water resistance (adhesion) | Heat resistance | Shelf stability |
|---|---|---|---|---|---|---|---|---|---|
| D (Synthesis Example 4) | — | D1 | sound | 14 | 25/25 | sound | 25/25 | sound | OK |
| E (Synthesis Example 5) | Particle II 1% | E1 | sound | 11 | 25/25 | sound | 25/25 | sound | OK |
| F (Comparative Synthesis Example 1) | — | F1 | cracked | 5 | 25/25 | unchanged | 25/25 | cracked | OK |
| G (Comparative Synthesis Example 2) | UVA-II 0.5% | G1 | sound | 3 | 25/25 | cracked | 25/25 | cracked | NG |

These coating compositions each were applied onto a co-extruded polycarbonate/acrylic resin plate (30 cm long, 20 cm wide, 0.5 mm thick) by flow casting and heated at 130° C. for one hour for curing. The resulting coats (~2.5 μm thick) were evaluated by the following tests, with the results being also shown in Table 3.

Tests on Cured Coats:

Coat Appearance

The coat was visually observed to find any defects.

Mar Resistance

The test was carried out according to ASTM 1044 using a Taber abrader equipped with an abrasive wheel CS-10F under a load of 500 g. After 500 revolutions, the sample was measured for haze. A difference in haze before and after the test is reported as an index of mar resistance.

Adhesion

According to JIS K5400, a coat was incised with a razor blade at intervals of 2 mm in orthogonal directions to form six incisions in each direction to define 25 square sections. Once a pressure-sensitive adhesive tape, Cellotape® (Nichiban Co., Ltd.) was attached closely to the coat, it was rapidly peeled back at an angle of 90°. The number (X) of remaining coat sections is reported as X/25.

Water Resistance

A sample was immersed in boiling water for 2 hours, after which any change of appearance and adhesion were examined.

Heat Resistance

A sample was heated in a hot air circulating drier at 130° C. for one hour, after which it was visually observed to find any cracks.

Shelf Stability

After a coating composition was aged at 40° C. for 2 weeks, its number average molecular weight Mn was determined by GPC. The composition was rated "OK" when the Mn of the aged sample increased by less than 15% from the initial Mn, and "NG" when the aged Mn increased by at least 15% from the initial Mn.

Example II and Comparative Example II

A primer was prepared by compounding an acrylic primer, Primer PC-7A (Shin-Etsu Chemical Co., Ltd.) with a 20% 1-methoxy-2-propanol solution of a UV absorber (PUVA-30M by Otsuka Chemical Co., Ltd., a copolymer of 30% 2-(2'-hydroxy-5'-methacryloxyethylphenyl)-2H-benzotriazole and 70% methyl methacrylate) in such amounts that the solids of UV absorber was 20% relative to the solids of Primer PC-7A. This primer was previously coated to a polycarbonate resin plate (30 cm long, 20 cm wide, 0.5 mm thick) by flow casting and curing at 130° C. for 30 minutes. To the primed plate, each of coating compositions A1, A2, and G1 prepared in Example I and composition H1 of Comparative Synthesis Example 3 was coated by flow casting, followed by curing at 130° C. for one hour. The resulting coats (2.5 μm thick) were evaluated by the same tests as above, with the results being shown in Table 4.

TABLE 4

Results of coat performance evaluation

| Base silicone resin | Additive | Coating composition | Coat appearance | Mar resistance | Adhesion | Water resistance (appearance) | Water resistance (adhesion) | Heat resistance | Shelf stability |
|---|---|---|---|---|---|---|---|---|---|
| A (Synthesis Example 1) | — | A1 | sound | 12 | 25/25 | sound | 25/25 | sound | OK |
| A (Synthesis Example 1) | Particle I 3% | A2 | sound | 9 | 25/25 | sound | 25/25 | sound | OK |

TABLE 4-continued

Results of coat performance evaluation

| Base silicone resin | Additive | Coating composition | Coat appearance | Mar resistance | Adhesion | Water resistance (appearance) | Water resistance (adhesion) | Heat resistance | Shelf stability |
|---|---|---|---|---|---|---|---|---|---|
| G (Comparative Synthesis Example 2) | — | G1 | cracked | 2 | 25/25 | cracked | 25/25 | cracked | OK |
| H (Comparative Synthesis Example 3) | UVA-II 0.5% | H1 | sound | 4 | 25/25 | sound | 25/25 | cracked | NG |

Example III and Comparative Example III

As in Example II, the primer prepared by compounding Primer PC-7A with a 20% 1-methoxy-2-propanol solution of a UV absorber PUVA-30M in such amounts that the solids of UV absorber was 20% relative to the solids of Primer PC-7A was previously coated to a polycarbonate resin plate (30 cm long, 20 cm wide, 0.5 mm thick) by flow casting and curing at 130° C. for 30 minutes. To the primed plate, each of coating compositions A1, B1, and C1 prepared in Example I and composition H1 of Comparative Synthesis Example 3 was coated by flow casting, followed by curing at 130° C. for one hour. The resulting coats (2.5 μm thick) were evaluated by a weathering test, with the results being shown in Table 5.

Weathering Test:

Using Eyesuper UV tester W-151 (Iwasaki Electric Co., Ltd.), a weathering test was carried out over 100 hours and 250 hours by repeating cycles consisting of [black panel temperature 63° C., humidity 50% RH, illuminance 50 mW/cm$^2$, raining intervals of 10 sec/hour for 5 hours] and [black panel temperature 30° C., humidity 95% RH for one hour]. Before and after the weathering test, the sample was determined for yellowing factor according to JIS K7103. The weathered coat was also examined for cracks and separation with naked eyes or under a microscope (250× magnifying power).

Weathering Crack Resistance of Coat

The coat after the weathering test was rated according to the following criterion.
○: sound
Δ: some cracks
X: cracks on entire coat Weathering Separation Resistance of Coat The coat after the weathering test was rated according to the following criterion.
○: sound
X: separation between a cured coat of silicone resin composition and a cured coat of primer

TABLE 5

Results of weathering test

| Base silicone resin | Additive | Coating composition | 100 hr weathering test | | | 250 hr weathering test | | |
|---|---|---|---|---|---|---|---|---|
| | | | Yellowing factor | Crack resistance | Separation | Yellowing factor | Crack resistance | Separation |
| A (Synthesis Example 1) | — | A1 | <1 | ○ | ○ | 3 | ○ | ○ |
| B (Synthesis Example 2) | UVA-I 4% | B1 | <1 | ○ | ○ | <1 | ○ | ○ |
| C (Synthesis Example 3) | UVA-II 0.5% + HALS-I 0.1% | C1 | <1 | ○ | ○ | 1 | ○ | ○ |
| H (Comparative Synthesis Example 3) | UVA-II 0.5% | H1 | <1 | Δ | ○ | 1 | X | X |

Japanese Patent Application No. 2004-008291 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of preparing a silicone resin comprising
    adding 50 parts to less than 100 parts by weight of water at pH 1 to 7 to 100 parts by weight of a mixture of components (A), (B) and (C) for effecting cohydrolytic condensation to form a silicone resin and an alcohol by-product, and distilling off the alcohol until the liquid temperature reaches 95° C., said mixture consisting of (A) a tetraalkoxysilane having the general formula: Si(OR')$_4$ wherein R' is an alkyl group of 1 to 3 carbon atoms, or a partial hydrolytic condensate thereof, (B) a trialkoxysilane having the general formula: R$^1$Si(OR')$_3$ wherein R$^1$ is hydrogen or a substituted or unsubstituted monovalent hydrocarbon group and R' is as defined above, or a partial hydrolytic condensate thereof, and (C) a dialkoxysilane having the general formula: (R$^2$)$_2$Si(OR')$_2$ wherein R$^2$ is hydrogen or a substituted or unsubstituted monovalent hydrocarbon group and R' is as defined above, or a partial hydrolytic condensate thereof, wherein the total of components (A), (B) and (C) is 100 Si mol %, the content of component (A) is 1 to 50 Si mol % based on the total of components (A), (B) and (C), the content of component (B) is 50 to 99 Si mol % based on the total of components (A), (B) and (C), and the content of component (C) is 0 to 10 Si mol % based on the total of components (A), (B) (C), thereby obtaining a silicone resin having a number average molecular weight of 2,390 to 40,000 as measured by gel permeation chromatography (GPC), and containing units of the formula: R$^1$SiO$_{(3-p)/2}$(OX)$_p$ derived from component (B) wherein X is hydrogen or R', R$^1$ and R' are as defined above, and p is an integer of 0 to 3, in which units of the formula: R$^1$SiO$_{3/2}$ wherein R$^1$ is as defined above account for 30 to 80 mol % and the total of units of the formulae: R$^1$SiO$_{2/2}$(OX) and R$^1$SiO$_{1/2}$(OX)$_2$ wherein R$^1$ and X are as defined above accounts for 20 to 70 mol %, as analyzed by silicon nuclear magnetic resonance spectroscopy ($^{29}$Si-NMR).

2. A method of preparing a silicone resin comprising adding 50 parts to less than 100 parts by weight of water at pH 1 to 7 to 100 parts by weight of a mixture of components (A), (B) and (C) for effecting cohydrolytic condensation to form a silicone resin and an alcohol by-product, distilling off the alcohol until the liquid temperature reaches 80° C. or higher, and prior to or during the step of distilling off the alcohol, adding an organic solvent selected from the group consisting of methyl propyl ketone, diethylketone, methyl isobutyll ketone, cyclohexanone, diacetone alcohol, dipropyl ether, dibutyl ether, anisole, dioxane, ethylene glycol monoethyl ether, ethylene glycol monobutyl ether, propylene glycol monomethyl ether, propylene glycol monomethyl ether acetate, propyl acetate, butyl acetate, and cyclohexyl acetate, said mixture consisting of (A) a tetraalkoxysilane having the general formula: Si(OR')$_4$ wherein R' is an alkyl group of 1 to 3 carbon atoms, or a partial hydrolytic condensate thereof, (B) a trialkoxysilane having the general formula: R$^1$Si(OR')$_3$ wherein R$^1$ is hydrogen or a substituted or unsubstituted monovalent hydrocarbon group and R' is as defined above, or a partial hydrolytic condensate thereof, and (C) a dialkoxysilane having the general formula: (R$^2$)$_2$Si(OR')$_2$ wherein R$^2$ is hydrogen or a substituted or unsubstituted monovalent hydrocarbon group and R' is as defined above, or a partial hydrolytic condensate thereof, wherein the total of components (A), (B) and (C) is 100 Si mol %, the content of component (A) is 1 to 50 Si mol % based on the total of components (A), (B) and (C), the content of component (B) is 50 to 99 Si mol % based on the total of components (A), (B) and (C), and the content of component (C) is 0 to 10 Si mol % based on the total of components (A), (B) and (C), thereby obtaining a silicone resin having a number average molecular weight of 2,390 to 40,000 as measured by gel permeation chromatography (GPC), and containing units of the formula: R$^1$SiO$_{(3-p)/2}$(OX)$_p$ derived from component (B) wherein X is hydrogen or R', R$^1$ and R' are as defined above, and p is an integer of 0 to 3, in which units of the formula: R$^1$SiO$_{3/2}$ wherein R$^1$ is as defined above account for 30 to 80 mol %, and the total of units of the formulae: R$^1$SiO$_{2/2}$(OX) and R$^1$SiO$_{1/2}$(OX)$_2$ wherein R$^1$ and X are as defined above accounts for 20 to 70 mol %, as analyzed by silicon nuclear magnetic resonance spectroscopy ($^{29}$Si-NMR).

3. The method of claim 2 wherein said organic solvent is cyclohexanone.

4. The method of claim 2 wherein the step of distilling off the alcohol until the liquid temperature reaches 95° C.

5. A method of preparing a silicone resin composition comprising mixing (1) a silicone resin, (2) a curing agent, (3) a solvent, and (4) an organic UV absorber selected from the group consisting of derivatives of hydroxybenzophenone, benzotriazole, cyanoacrylate and triazine backbone compounds, and/or a UV stabilizer having at least one cyclic hindered amine structure within a molecule, wherein said silicone resin is prepared by adding 50 parts to less than 100 parts by weight of water at pH 1 to 7 to 100 parts by weight of a mixture of components (A), (B) and (C) for effecting cohydrolytic condensation to form a silicone resin and an alcohol by-product, and distilling off the alcohol until the liquid temperature reaches 95° C., said mixture consisting of (A) a tetraalkoxysilane having the general formula: Si(OR')$_4$ wherein R' is an alkyl group of 1 to 3 carbon atoms, or a partial hydrolytic condensate thereof, (B) a trialkoxysilane having the general formula: R$^1$Si(OR')$_3$ wherein R$^1$ is hydrogen or a substituted or unsubstituted monovalent hydrocarbon group and R' is as defined above, or a partial hydrolytic condensate thereof, and (C) a dialkoxysilane having the general formula: (R$^2$)$_2$Si(OR')$_2$ wherein R$^2$ is hydrogen or a substituted or unsubstituted monovalent hydrocarbon group and R' is as defined above, or a partial hydrolytic condensate thereof, wherein the total of components (A), (B) and (C) is 100 Si mol %, the content of component (A) is 1 to 50 Si mol % based on the total of components (A), (B) and (C), the content of component (B) is 50 to 99 Si mol % based on the total of components (A), (B) and (C), and the content of component (C) is 0 to 10 Si mol % based on the total of components (A), (B) and (C), thereby obtaining a silicone resin having a number average molecular weight of 2,390 to 40,000 as measured by gel permeation chromatography (GPC), and containing units of the formula: R$^1$SiO$_{(3-p)/2}$(OX)$_p$ derived from component (B) wherein X is hydrogen or R', R$^1$ and R' are as defined above, and p is an integer of 0 to 3, in which units of the formula: R$^1$SiO$_{3/2}$ wherein R$^1$ is as defined above account for 30 to 80 mol %, and the total of units of the formulae: R$^1$SiO$_{2/2}$(OX) and R$^1$SiO$_{1/2}$(OX)$_2$ wherein R$^1$ and X are as defined above accounts for 20 to 70 mol %, as analyzed by silicon nuclear magnetic resonance spectroscopy ($^{29}$Si-NMR).

6. A method of preparing a silicone resin composition comprising mixing (1) a silicone resin, (2) a curing agent, (3) a solvent, and (4) an organic UV absorber selected from the group consisting of derivatives of hydroxybenzophenone, benzotriazole, cyanoacrylate and triazine backbone compounds, and/or a UV stabilizer having at least one cyclic hindered amine structure within a molecule, wherein said silicone resin is prepared by adding 50 parts to less than 100 parts by weight of water at pH 1 to 7 to 100 parts by weight of a mixture of components (A), (B) and (C) for effecting cohydrolytic condensation to form a silicone resin and an alcohol by-product, distilling off the alcohol until the liquid temperature reaches 80° C. or higher, and prior to or during the step of distilling off the alcohol, adding an organic solvent selected from the group consisting of methyl propyl ketone, diethylketone, methyl isobutyl ketone, cyclohexanone, diacetone alcohol, dipropyl ether, dibutyl ether, anisole, dioxane, ethylene glycol monoethyl ether, ethylene glycol monobutyl ether, propylene glycol monomethyl ether, propylene glycol monomethyl ether acetate, propyl acetate, butyl acetate, and cyclohexyl acetate, said mixture consisting of (A) a tetraalkoxysilane having the general formula: $Si(OR')_4$ wherein R' is an alkyl group of 1 to 3 carbon atoms, or a partial hydrolytic condensate thereof, (B) a trialkoxysilane having the general formula: $R^1Si(OR')_3$ wherein $R^1$ is hydrogen or a substituted or unsubstituted monovalent hydrocarbon group and R' is as defined above, or a partial hydrolytic condensate thereof, and (C) a dialkoxysilane having the general formula: $(R^2)_2Si(OR')_2$ wherein $R^2$ is hydrogen or a substituted or unsubstituted monovalent hydrocarbon group and R' is as defined above, or a partial hydrolytic condensate thereof, wherein the total of components (A), (B) and (C) is 100 Si mol %, the content of component (A) is 1 to 50 Si mol % based on the total of components (A), (B) and (C), the content of component (B) is 50 to 99 Si mol % based on the total of components (A), (B) and (C), and the content of component (C) is 0 to 10 Si mol % based on the total of components (A), (B) and (C), thereby obtaining a silicone resin having a number average molecular weight of 2,390 to 40,000 as measured by gel permeation chromatography (GPC), and containing units of the formula: $R^1SiO_{(3-p)/2}(OX)_p$ derived from component (B) wherein X is hydrogen or R', $R^1$ and R' are as defined above, and p is an integer of 0 to 3, in which units of the formula: $R^1SiO_{3/2}$ wherein $R^1$ is as defined above account for 30 to 80 mol %, and the total of units of the formulae: $R^1SiO_{2/2}(OX)$ and $R^1SiO_{1/2}(OX)_2$ wherein $R^1$ and X are as defined above accounts for 20 to 70 mol %, as analyzed by silicon nuclear magnetic resonance spectroscopy ($^{29}$Si-NMR).

7. The method of claim 6 wherein said organic solvent is cyclohexanone.

8. The method of claim 6 wherein the step of distilling off the alcohol until the liquid temperature reaches 95° C.

* * * * *